United States Patent [19]

Oertel et al.

[11] 3,875,246

[45] Apr. 1, 1975

[54] ALPHA, ALPHA-BIS-(2-HYDROXYPHENYL)-DIISOPROPYL BENZENES

[75] Inventors: Harald Oertel, Odenthal-Gloebusch; Ernst Roos, Cologne; Kurt Ley, Odenthal-Gloebusch, all of Germany

[73] Assignee: Bayer Aktiengesellschaft, Leverkusen, Germany

[22] Filed: June 13, 1973

[21] Appl. No.: 369,507

Related U.S. Application Data

[62] Division of Ser. No. 122,557, March 9, 1971, Pat. No. 3,778,409.

[30] Foreign Application Priority Data

Mar. 14, 1970 Germany............................ 2012285

[52] U.S. Cl. ......................... 260/619 B, 260/619 D
[51] Int. Cl. ............................................. C07c 39/12
[58] Field of Search ........ 260/619 A, 619 R, 619 B, 260/619 D, 45.95

[56] References Cited

UNITED STATES PATENTS

| | | | |
|---|---|---|---|
| 3,318,961 | 5/1967 | Hunter et al. | 260/619 A X |
| 3,350,347 | 10/1967 | Casey | 260/45.95 |
| 3,378,518 | 4/1968 | Doyle | 260/619 A X |
| 3,393,244 | 7/1968 | Broderick et al. | 260/619 A X |
| 3,414,542 | 12/1968 | Vitrone | 260/619 A X |
| 3,642,669 | 2/1972 | Nast et al. | 260/45.95 |

*Primary Examiner*—Bernard Helfin
*Assistant Examiner*—Norman Morgenstein
*Attorney, Agent, or Firm*—Plumley & Tyner

[57] ABSTRACT

The invention relates to a process for stabilising polyurethanes, particularly polyurethane elastomer threads and films, against degradation and discoloration under the action of light or UV radiation, oxygen, atmospheric constituents (e.g. nitrogen oxides) and heat by the addition of bisphenols.

2 Claims, No Drawings

ALPHA, ALPHA-BIS-(2-HYDROXYPHENYL)-DIISOPROPYL BENZENES

This is a division of application, Ser. No. 122,557 filed Mar. 9, 1971, now U.S. Pat. No. 3,778,409.

The invention relates to a process for stabilising polyurethanes, particularly polyurethane elastomer threads and films, against degradation and discoloration under the action of light or UV radiation, oxygen, atmospheric constituents (e.g. nitrogen oxides) and heat by the addition of bisphenols of the general formula I:

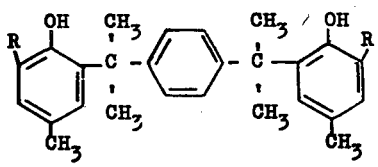

as stabilisers, in which formula

R represents a straight chain or branched $C_1$ to $C_{18}$ alkyl radical, a $C_5$ to $C_6$ cycloalkyl radical, if desired substituted by lower alkyl radicals, or a $C_7$ to $C_9$ aralkyl radical, or if desired a stabiliser mixture of the above mentioned bisphenols and UV stabilisers preferably derivatives of a 2-(2'-hydroxyphenyl)-benzotriazole.

Polyurethanes prepared from higher molecular weight polyhydroxyl compounds, polyisocyanates and chain lengthening agents, which polyurethanes are widely used in the form of foam resins, elastomers, coatings, films or elastomer threads, are unstable to light and to some extent also to air at elevated temperatures, the degree of instability depending to some extent on the components from which they have been prepared. As a result of this instability, their mechanical properties deteriorate and in many cases there occurs in addition a severe discoloration of the polyurethanes.

Many attempts have been made to protect the polyurethanes against discoloration and degradation by the addition of known antioxidants, e.g. those based on phenol, but such stabilisation is generally not sufficient.

Thus, for example, phenols such as 4,4'-alkylidene-bis-(6-tertiary butyl)-m-cresol, 2,6-ditertiary butyl-4-methyl-phenol or 4,4'-methylene-bis-(2,6-ditertiary butyl phenol) have been tested for use as stabilisers but they either impart an unwanted colour to the products right from the start or fail to protect the products against discoloration under the action of light or atmospheric constituents. Polyphenols such as 1,3,5-trimethyl-2,4,6-tris-(3,5-ditertiary butyl-4-hydroxybenzyl)-benzene have also been proposed as stabilisers (DAS No. 1,243,866). In addition, numerous phenolic compounds have been mentioned which are said to be suitable for stabilising polyurethanes if used together with hydroxybenzophenones (DAS No. 1,106,490). The effect of these phenolic stabilisers, however, is not sufficient. They are not wash-resistant and they have a colour of their own which is unacceptable, e.g. if they are used in white elastomer threads.

A new class of phenolic stabilisers has now been found which by virtue of their particular structure enables highly effective stabilisation of polyurethanes to be achieved. These stabilisers are themselves colourless, cause no discoloration in polyurethanes and provide substantially better protection to discoloration and degradation under the influence of visible and/or UV light and/or atmospheric constituents (such as oxygen, nitric oxide and waste gases from combustion). In addition, the substances are readily soluble in polyurethane elastomers and do not form crystalline deposits on the surface.

The invention also relates to the use of 0.01 to 10% by weight of bisphenols of the general formula I:

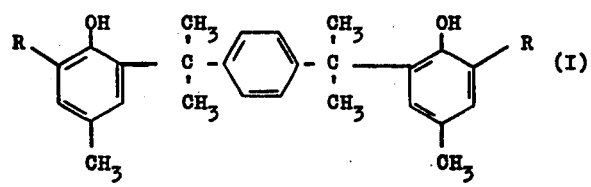

in which

R represents a straight chain or branched $C_1$ to $C_{18}$ alkyl radical (preferably a $C_9$ alkyl radical), a $C_5$ to $C_6$ cycloalkyl radical which may be substituted by lower alkyl radicals, and $C_7$ to $C_9$ aralkyl radicals, as stabilisers to stabilise segmented polyurethane elastomers against discoloration and deterioration of their mechanical strength.

The following are given as examples of radicals R: methyl, ethyl, n-propyl, isopropyl, n-butyl, secondary butyl, tertiary butyl, amyl, isoamyl, hexyl, isohexyl, isooctyl, isononyl; cyclopentyl, cyclohexyl, 4-methylcyclohexyl, α-methylcyclohexyl; benzyl, α-methylbenzyl and α,α-dimethyl benzyl.

The bisphenols used are preferably bisphenols of the following general formula:

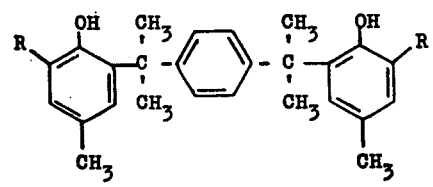

in which

R represents a methyl, t-butyl, cyclopentyl or cyclohexyl group, these bisphenols being used in quantities of 0.05 to 5.0% by weight, based on the polyurethane elastomers.

0.2 to 3% by weight of the following stabilisers, based on the polyurethane elastomers, are advantageously used:

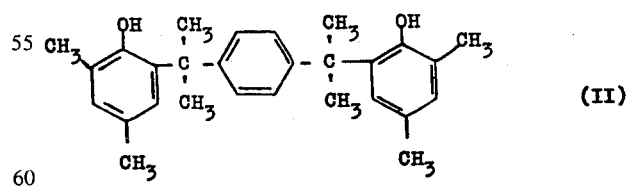

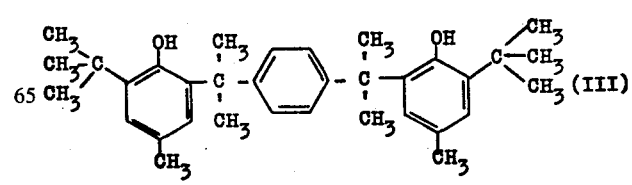

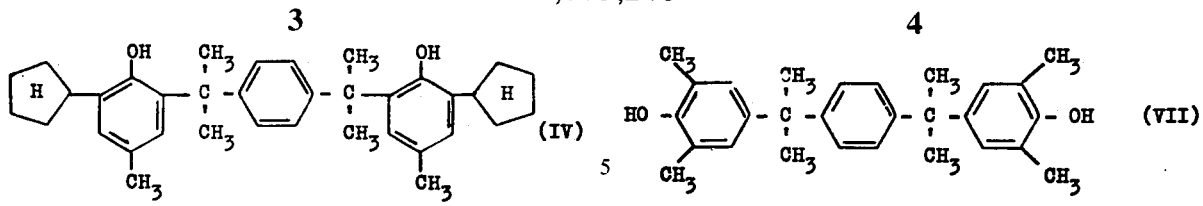

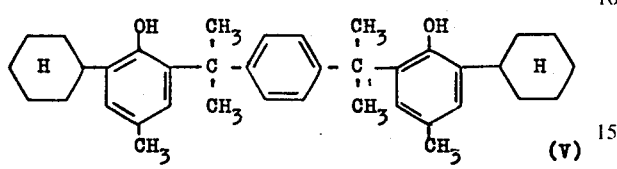

The α, α′(-bis-(2-hydroxyphenyl)-1,4-diisopropyl benzenes used according to the invention, which will hereinafter be referred to briefly as bisphenols, are new compounds and can be prepared by the reaction of α,α′-dihydroxy-1,4-diisopropyl benzene with ortho-substituted 4-methylphenols in the presence of acid dehydration catalysts, water being split off in the process; e.g. according to the following reaction equation:

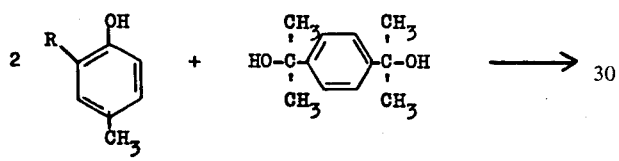

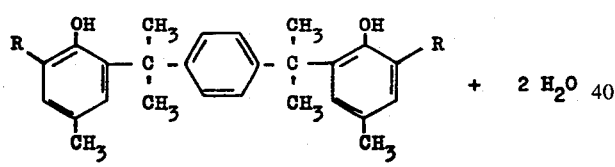

in which formula, R has the meaning already given for formula I.

The substantial improvement which can be obtained by using the new bisphenols is demonstrated by comparison tests in which they are compared with a commercial mononuclear phenol 2,6-ditertiary-butyl-p-cresol, a binuclear phenol methylene-bis-(2-hydroxy-3-tertiary butyl-5-methyl phenol) and a trinuclear phenol 1,3,5-trimethyl-2,4,6-tris-(3,5-ditertiary butyl-4-hydroxybenzyl) benzene (X). Two other examples, in which a bisphenol unsubstituted in the ortho-position (VI) and a bisphenol having OH groups in the p-position (VII) (as described in Belgian Pat. Specification No. 604,516) were used, demonstrate the strict dependence between the action and the constitution of the bisphenols.

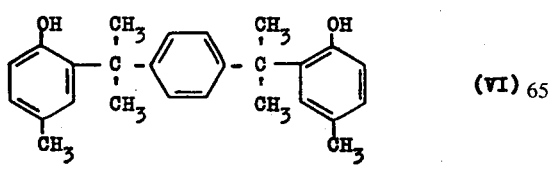

These experiments show, among other things, that the phenols conventionally used as stabilisers, which are similar in structure to the phenols represented in the above formulae but which instead of the $C(CH_3)_2$ group have only a $CH_2$ group between the benzene rings, e.g. bisphenols or trisphenols such as:

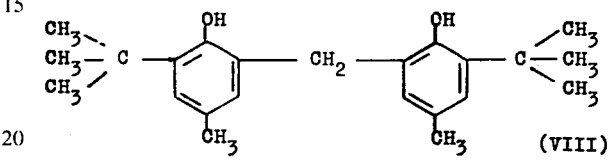

or

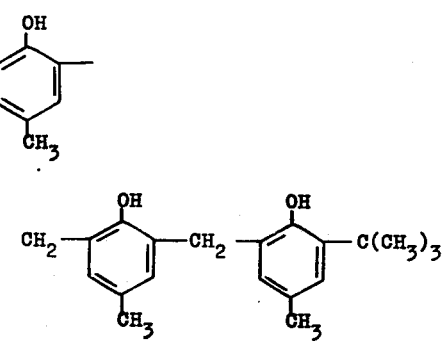

differ from the stabilisers according to the invention in that they themselves undergo strong discoloration (yellowing) when exposed to UV light and are therefore unsuitable for stabilishing colourless polyurethanes. In addition, the bisphenols according to the invention shown better stabilisation against degradation than, for example, the known phenolic stabiliser 1,3,5-trimethyl-2,4,6-triu-(4-hydroxy-3,5-ditertiary butyl benzyl) benzene (according to DAS No. 1,243,866). A relatively slight modification of the structure of the phenols according to the invention, e.g. a shift of the alkyl radicals, results in a substantial reduction in the stabilisation effects and, in some cases, yellow discoloration is observed (see comparison tests).

The efficient stabilising effect of the special phenolic compounds according to the invention, which is so significant for polyurethane elastomers, was unexpected and could not have been predicted.

Suprisingly, the effect of the phenols is not entirely dependent upon the presence of a tertiary alkyl radical in the ortho-position to the hydroxy group, and compounds which have a secondary or primary alkyl radical are equally efficient.

The invention also relates to the use of 0.05 to 5.0% by weight of a stabiliser mixture consisting of:
a. bisphenols according to the invention and, in addition
b. 2-(2′-hydroxyphenyl)-benzotriazoles for stabilising polyurethanes.

Bisphenols of the following formula I are used:

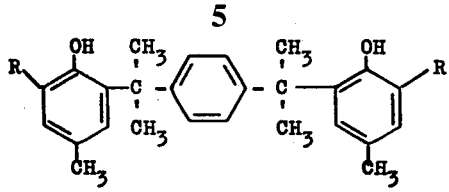

in which R has the meaning already given.

2-(2'-Hydroxyphenyl)-benzotriazoles of the following formula are used:

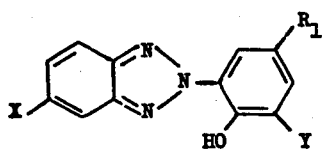

in which
X represents a hydrogen atom, an alkyl group or a halogen atom,
Y represents a hydrogen atom, a $C_1$ to $C_{12}$ alkyl radical or an alkylene radical having hetero atoms, preferably a tertiary alkyl radical such as tertiary butyl, tertiary amyl or tertiary dodecyl, and
$R_1$ represents hydrogen or a $C_1$ to $C_{12}$ alkyl radical, e.g. methyl, ethyl, isopropyl, tertiary butyl, tertiary amyl, tertiary octyl or tertiary dodecyl.

The mixture is used in proportions by weight of compound A to compound B of 1:10 to 10:1, the polyurethane elastomers thereby undergoing a synergistic stabilisation against discoloration and degradation under the action of light, heat and atomospheric constituents.

The use of 2-(2'-hydroxyphenyl)-benzotriazoles as stabilising additives to polymers is known per se but is entirely inadequate when used as the only means of stabilisation. A combination of 2-(2'-hydroxyphenyl)-benzotriazoles and 1,3,5-trimethyl-2,4,6-tris-(3,5-ditertiary butyl-4-hydroxybenzyl)benzene or 1,2,4,5-tetramethyl-3,6-bis-(3,5-ditertiary butyl-4-hydroxybenzyl)benzene has also been described in Dutch Auslegeschrift NE 6,509,745 for stabilising segmented polyurethanes. These additives do provide a certain amount of protection but it is insufficient and the need for a highly efficient, resistant stabilisation of elastomers, particularly of elastomer threads, remains.

In the preferred embodiment of the invention, the compound (b) used is one of the benzotriazoles of the following formula:

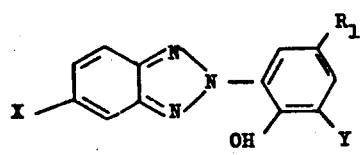

in which
X represents a hydrogen or chlorine atom,
Y represents a hydrogen atom or a $C_1$ to $C_{12}$ alkyl radical, preferably a tertiary alkyl radical, such as tertiary butyl or tertiary amyl or an N-methylene-phthalimido radical, and $R_1$ represents a hydrogen atom, a $C_1$ to $C_{12}$ alkyl radical, e.g. methyl ethyl, isopropyl, tertiary butyl or tertiary amyl radical.

The following compounds are given as examples of light protective agents based on 2-(2'-hydroxyphenyl)-benzotriazole:
  1-(2'-hydroxy-5'-methylphenyl)-benzotriazole,
  1-(2'-hydroxy-5'-methylphenyl)-5-chlorobenzotriazole,
  2-(2'-hydroxy-3'-tertiary butyl-5-methylphenyl)-benzotriazole,
  2-(2'-hydroxy-3'-tertiary butyl-5-methylphenyl)-5-chlorobenzotriazole,
  2-(2'-hydroxy-3'-methyl-5-tertiary butylphenyl)-benzotraizole,
  2-(2'-hydroxy-3'-methyl-5-tertiary butylphenyl)-5-chlorobenzotriazole,
  2-(2'-hydroxy-3',5'-dimethylphenyl)-benzotriazole,
  2-(2'-hydroxy-3',5'-dimethylphenyl)-5-chlorobenzotriazole,
  2-(2'-hydroxy-3',5'-ditertiary butylphenyl)-benzotriazole,
  2-(2'-hydroxy-3',5'-ditertiary butylphenyl)-5-chlorobenzotriazole,
  2-(2'-hydroxy-3',5'-ditertiary amylphenyl)-benzotriazole,
  2-(2'-hydroxy-3',5'-ditertiary amylphenyl)-5-chlorobenzotriazole,
  2-(2'-hydroxy-3',5'-ditertiary octylphenyl)-benzotriazole,
  2-(2'-hydroxy-3',5'-ditertiary octylphenyl)-5-chlorobenzotriazole, and
  2-(2'-hydroxy-3'-N-methylene-phthalimido)-benzotriazole.

Other suitable hydroxyphenyl benzotriazoles are mentioned, for example, in German Auslegeschrift No. 1,213,408; 1,213,409 and 1,213,410 and in U.S. Patent Specification No. 3,213,508. Known polyurethane stabilisers (see, for example, German Auslegeschrift No. 1,157,386) may also be added.

The elastic polyurethanes which are to be stabilised, which may be in the form of foams, can be obtained by known processes and from known starting materials. The polyurethanes are generally prepared by reacting higher molecular weight polyhydroxyl compounds (e.g. polyesters or polyethers having a molecular weight of about 500 to 5000, melting points preferably below 60°C) with aliphatic, araliphatic or aromatic polyisocyanates (preferably aromatic diisocyanates such as tolu-ylene diisocyanate or diphenylmethane-4,4'-diisocyanate) and so-called chain lengthening agents, i.e. low molecular weight compounds (molecular weight e.g. 18 to 400) which have two or more groups that are reactive with isocyanate (e.g. water, low molecular weight diols, diamines, dihydrazides or similar compounds, e.g. aminoalcohols, aminohydrazides, hydroxy hydrazides, aminosemicarbazides, semicarbazido hydrazides, semicarbazido carbazic esters or mixtures of these chain lengthening agents) in a single stage or in a multi-stage process in the melt or in solvents. Numerous known processes or modifications thereof may be employed for this reaction.

The following are given as examples of starting materials: polyesters of adipic acid and dialcohols containing 2 to about 10 carbon atoms, preferably those containing more than 5 carbon atoms, the dialcohols, if desired, being also used for lowering the melting points of the polyesters in the mixture; polyesters of caprolactone and dialcohols, polyalkylene ether diols, especially polytetramethylene ether diols, polytrimethylene ether diols, polypropylene glycol or the corresponding copolyethers. The diisocyanates used are preferably aromatic diisocyanates, such as diphenylmethane-4,4'-diisocyanate, tolylene diisocyanate, araliphatic diisocyanates such as m-xylylene diisocyanate or aliphatic diisocyanates such as hexamethylene diisocyanate and dicyclohexylmethane-4,4'-diisocyanate. These starting materials are reacted together, if desired, with the addition of other dialcohols, to form NCO prepolymers which preferably have the structure indicated in Belgian Pat. Specification No. 734,194. Suitable chain lengthening agents, which may be used as mixtures or in a stepwise reaction, include water and/or dialcohols or trialchohols such as butane diol and p-xylylene glycols, trimethylol propane, aminoalcohols such as ethanolamine, diamines such as diphenylmethane-4,4'-diamine, 3,3'-dichloro-diphenyl-methane-4,4'-diamine, but preferably aliphatic diamines such as ethylene diamine, 1,2-propylene diamine, isophorone diamine, metaxylene diamine and hydrazine or dihydrazides such as carbodihydrazide, oxalic acid dihydrazide, glutaric acid dihydrazide, pimelic acid dihydrazide, terephthalic acid dihydrazide or semicarbazidohydrazides such as β-semicarbazide alanyl hydrazide; if desired, theey may be used as mixtures of chain lengthening agents.

The polyurethanes to be stabilised are preferably of the type which, in addition to urethane groups, also contain NH—CO—NH groups obtained by reacting isocyanate groups with water and/or with compounds containing NH$_2$ end groups (e.g. diamines, dihydrazides, carbodihydrazide, semicarbazido hydrazides or hydrazine) and which have a substantially linear, segmented molecular structure, are soluble in highly polar solvents such as dimethyl formamide or dimethyl acetamide before they are shaped and whose characteristic segments may be represented by the following formula:

—Y.NH.CO.NH.X.NH.CO.NH.— which may be obtained by reacting an NCO prepolymer OCN.Y.NCO with a chain lengthening agent H$_2$N.X.NHX.NH$_2$.

The radical Y of the NCO prepolymer may, for example, have the following structure:

—R.N.H.CO.O.D.O.CO.NH.R— or another of the usual structures (see Belgian Pat. Specification No. 734,194).

In the above formula

R represents a divalent aliphatic, araliphatic or aromatic radical (of a diisocyanate), D represents the radical of a higher molecular weight polyhydroxyl compound having a molecular weight of 500 to 5000 and melting points below 60°C without its terminal hydroxyl groups (e.g. the radical of a polyalkylene ether, polyester, polyacetal or poly-N-alkyl urethane), X represents the radical of a divalent chain lengthening agent which has terminal NH$_2$ groups but without the terminal NH$_2$ groups, e.g. an aliphatic, araliphatic, aromatic or heterocyclic radical, an HN—CO—alkylene—CO—NH radical, an NH—CO—NH—(CH$_2$)$_2$—CO—NH radical, a bond between two N atoms. Munich, The synthesis of such polyurethane (ureas) has been fully described, e.g. in German Auslegeschrift No. 1,270,276 and in Belgian Pat. Specification No. 734,194. Polyurethane foam resins can be prepared by known processes and formulations, e.g. with the addition of stabilisers to the starting components (e.g. polyethers) (see e.g. Kunststoff-Handbuch Volume VII, Polyurethane, publishers Carl Hanser Verlag Munic, 1966, pages 440 to 457, 504 to 531).

The stabilisers may be incorporated in the polyurethanes by any method adapted to the technical process requirements. The simplest method consists of adding the stabilisers, if desired in the form of solutions, to solutions of the polyurethanes, e.g. their solutions in highly polar solvents such as dimethyl formamide or dimethyl sulphoxide which is in the form in which they are preferably used for spinning, coating or coagulation purposes. Alternatively, the stabilisers may be incorporated in the melts or plasticised polyurethane sheets by means of suitable mixing devices such as kneaders or rollers. In the case of elastomer threads, the stabilisers may also be applied to the surface together with the dressing.

Another possibility lies in adding the stabilisers to the starting materials used for the preparation of the polyurethanes and only then carrying out the polyurethane synthesis. Thus, for example, bisphenol compounds are soluble in higher molecular weight polyhydroxyl compounds (e.g. polyesters or polyethers). The polyurethane syntheses, e.g. production of foam resins or elastomers, can then be carried out with such polyesters or polyethers which already contain stabiliser. The stabilisers may also be added to the diisocyanates or to the prepolymers of higher molecular weight polyhydroxyl compounds and (excess molar quantities) of diisocyanates before the formation of polyurethane is carried out, e.g. by spinning it into aqueous diamine solutions. Discoloration of the polyurethanes can be prevented during synthesis of the polyurethanes by using the stabilisers in the reaction of NCO prepolymers with chain lengthening agents such as diamines, hydrazine, hydrazides or similar chain lengthening agents in highly polar solvents such as dimethyl formamide or dimethyl acetamide. The quantity of stabilisers added is 0.01 to 10% by weight, preferably 0.2 to 3.0% by weight.

The light-protective action is enhanced by adding the stabilisers according to the invention to polyurethanes which contain 0.02 to 1 mol, preferably 0.05 to 0.3 mol, per kg of elastomer substance, of reactants which contain aliphatically substituted tertiary amino groups. Examples of such reactants are glycols, diamines, dihydrazides or polyesters or polyesters containing tertiary amino groups, e.g. N,N-bis-(β-hydroxypropyl)-methylamine, N,N'-bis-(β-hydroxyethyl)-piperazine, N,N'-dimethyl ethylene diamine, N,N'-bis-(γ-aminopropyl)-ethylene diamine, N,N'-bis-(γ-aminopropyl)-piperazine or polyethers which contain tertiary amino groups, or polyesters which contain tertiary amino groups, which compounds are prepared from dialcohols which contain tertiary amino groups.

Preparation of the bisphenols of the general formula I according to the invention Synthesis of the bisphenols may be carried out by reacting α,α'-dihydroxy-1,4-diisopropyl benzene with ortho-substituted 4-methylphenols (water being split off) in the presence of acid dehydration catalysts such as p-toluene sulphonic acid, phosphoric acid, sulphuric acid, hydrochloric acid or strongly acid ion exchangers.

The water formed on condensation may, if desired, be removed by azeotropic distillation. Suitable solvents, e.g., are benzene, cyclohexane, cleaning petrol, toluene, xylene and chlorinated hydrocarbons such as chloroform, carbon tetrachloride and tetrachloroethylene.

Another process for the preparation of the bisphenols according to the invention consists in condensing α,α'-dihydroxy-1,4-diisopropyl benzene with 2 molecules of p-cresol with elimination of water by the process mentioned above and then alkylating, cycloalkylating or aralkylating the free ortho-positions with suitable olefins or carbinols.

Processes of this type are known as such and do not constitute a subject of the present invention.

The following examples serve rather to explain more fully the preparation of the bisphenols according to the invention and of compounds VI and VII used for comparison tests.

α,α'-Bis-(2-hydroxy-3,5-dimethylphenyl)-1,4-diisopropyl benzene (Compound II on page 4)

220 g (1.8 mol) of 2,4-dimethylphenol, 97 g (0.5 mol) of α,α'-dihydroxy-1,4-diisopropyl benzene and 500 ml of xylene were boiled for 1 hour in a water separator with the addition of 5 g of p-koluene sulphonic acid, 18 ml of water being separated. After cooling, 500 ml of petroleum ether were added to the mixture, the mixture was cooled to 5°C, and the colourless crystals which separated were removed by suction filtration. They have a melting point of 178°C to 179°C.

$C_{28}H_{34}O_2$ Molecular weight: 402.
Calculated:   C, 83.58;   H, 8.46;   O, 7.96.
Found:        C, 83.9;    H, 8.7;    O, 7.9.

α,α'-Bis-(2-hydroxy-3-tertiary butyl-5-methylphenyl)-1,4-diisopropyl benzene: (Compound III on page 4) 164 g (1 mol) of 2-tertiary butyl-p-cresol, 49 g (0.25 mol) of α,α'-dihydroxy-1,4-diisopropyl benzene and 2.5 g of p-toluene sulphonic acid in 400 ml of cleaning petrol were boiled in a water separator for one hour, 9 ml of water being separated. 2 g of ammonia were introduced to neutralise the catalyst. The mixture was filtered and completely distilled under vacuum at temperatures of up to 100°C. On the addition of methanol, a colourless powder precipitated. This was filtered off under suction and dried. M.p. 105°C.

$C_{34}H_{46}O_2$ Molecular weight: 486.
Calculated:   C, 83.95;   H, 9.47;   O, 6.58.
Found:        C, 83.9;    H, 9.4;    O, 6.0.

β,β'-Bis-(2-hydroxy-3-cyclopentyl-5-methylphenyl)-1,4-diisopropyl benzene: (Compound IV on page 5)

352 g (2 mol) of 2-cyclopentyl-p-cresol, 97 g (0.5 mol) of α,α'-dihydroxy-1,4-diisopropyl benzene and 5 g of p-toluene sulphonic acid in 500 ml of cleaning petrol were boiled in a water separator for 2 hours, 18 ml of water being separated. 2 g of ammonia were introduced, the solution was filtered, and 50 ml of methanol were added. The precipitated crystals were purified by recrystallisation from toluene. Colourless crystals, m.p. 220°C.

α,α-Bis-(2-hydroxy-3-cyclohexyl-5-methylphenyl)-1,4-diisopropyl benzene:(Compound V on page 5)

380 g (2 mol) of 2-cyclohexyl-p-cresol, 97 g (0.5 mol) of α,α'-dihydroxy-1,4-diisopropyl benzene and 5 g of p-toluene sulphonic acid in 600 ml of cleaning petrol were boiled in a water separator for one hour, 18 ml of water being separated. 2 g of ammonia were introduced at 50°C. After filtration, 500 ml of methanol were added to the solution, colourless crystals being precipitated.
M.p. 204°C.

$C_{38}H_{50}O_2$ Molecular weight: 538.
Calculated:   C, 84.76;   H, 9.29;   O, 5.95.
Found:        C, 84.1;    H, 9.3;    O, 6.2.

α,α'-Bis-(2-hydroxy-5-methylphenyl)-1,4-diisopropyl benzene: (Compound VI on page 6)

216 g (2 mol) of p-cresol, 97 g (0.5 mol) of α,α'-dihydroxy-1,4-diisopropyl benzene, 5 g of p-toluene sulphonic acid and 500 ml of cleaning petrol were boiled in a water separator for 1 hour, 18 ml of water being separated. The crystallised product was removed by suction filtration at 0°C and recrystallised from benzene. Colourless crystals, m.p. 1830°C.

$C_{26}H_{30}O_2$ Molecular weight: 374.
Calculated:   C, 83.42;   H, 8.02;   O, 8.56.
Found:        C, 83.7;    H, 8.0;    O, 8.9.

α,α'-Bis-(4-hydroxy-3,5-dimethylphenyl)-1,4-diisopropyl benzene: (Compound VII on page 6)

122 g (1 mol) of 2-hydroxy-1,3-dimethyl benzene, 49 g (0.25 mol) of α,α'-dihydroxy-1,4-diisopropyl benzene, 2.5 g of p-toluene sulphonic acid and 300 ml of cleaning petrol were boiled in a water separator for 1 hour, 9 ml of water being separated. 1 g of ammonia was introduced into the hot solution. After filtration and when the solution was cold, 250 ml of petroleum ether were added and the crystal paste which precipitated was removed by suction filtration at 0°C and recrystallised from toluene. Colourless crystals, m.p. 160°C.

$C_{28}H_{34}O_2$ Molecular weight: 402.
Calculated:   C, 83.58;   H, 8.46;   O, 7.46.
Found:        C, 83.6;    H, 8.6;    O, 8.2.

The following examples are to further illustrate the invention without limiting it.

Example 1

500 Parts of a polytetramethylene ether diol (molecular weight 1010), 104 parts of N.N-bis-(β-hydroxypropyl)-N-methylamine, 1822 parts of diphenylmethane-4,4'-diisocyanate and 1740 parts of chlorobenzene were heated to 60°C to 68°C for 68 minutes and then cooled to room temperature. 6450 Parts of this NCO prepolymer solution (2.05% NCO based on solid substance) are introduced in the course of 10 minutes with vigorous stirring into a fresh suspension prepared by the addition of 75 parts of solid carbon dioxide to a solution of 73.7 parts of ethylene diamine and 4.68 parts of 1,2-propylene diamine in 13,440 parts of dimethyl formamide, a homogeneous, slightly yellowish elastomer solution being obtained which is pigmented by the addition of 4% by weight (based on elastomer solid substance) of titanium dioxide (rutile). The elastomer solution (viscosity 610 poises) is made up into films in separate portions with and without the addition of stabiliser in the usual manner and the films are cut up into threads which are then exposed to UV light (Fadeometer) (see Table 2). Portions of these elastomer solutions are spun by the usual dry spinning process and the threads are exposed to light in a Xenon test with and without the addition of stabiliser (see Table 1). If the 2% by weight of stabiliser are not added subsequently to the finished elastomer solution but dissolved in dimethyl formamide together with diamines and the elastomer solution is then prepared from the NCO prepolymer, a colourless elastomer solution is obtained which does not undergo discoloration when exposed to air. After formation of the films and exposure of the threads to light, the stabilising effect against degradation of mechanical strength under exposure to light was found to be practically identical.

Example 2

The bisphenols and comparison stabilisers shown in the table are dissolved in the elastomer solution (according to Example 1) in the quantities indicated. After casting of the elastomer solution and drying to produce films, the films are cut up into strips which are then exposed in the Fadeometer for the length of time indicated.

Table 1

Loss in strength of elastomer threads produced by the dry spinning process (individual denier approx. 10 dtex, total denier approx. 220 dtex) after Xeno test exposure

|  | Before Exposure | | 72 Hours | | 145 Hours | | |
| --- | --- | --- | --- | --- | --- | --- | --- |
|  | Ultimate tensile strength g/dtex | Elongation at break % | Ultimate tensile strength g/dtex | Elongation at break % | Ultimate tensile strength g/dtex | Elongation at break % | Remarks |
| without stabiliser | 0.59 (colourless) | 506 | 0.17 yellowish | 372 | no longer measurable yellowish - yellow | | |
| 1% stabiliser II | 0.61 (colourless) | 500 | — colourless | — | 0.40 colourless | 480 | yellowish only after more than 200 hours |
| 2% stabiliser II | 0.66 (colourless) | 510 | — colourless | — | 0.52 colourless | 525 | yellowish only after about 225 hours |
| 1.33% stabiliser + 0.67% 2-(2'-hydroxy-3'-t-butyl-5'-methylphenyl) benzotriazole | 0.66 colourless | 510 | 0.63 colourless | 510 | 0.60 colourless | 512 | synergistically active mixture. Yellowish only after about 300 hours. |

Table 2

Fadeometer exposure of film strips or cut threads

|  | Before Exposure | | After Fadeometer Exposure of: | | | | | |
| --- | --- | --- | --- | --- | --- | --- | --- | --- |
|  | | | 22 Hours | | 44 Hours | | 66 Hours | |
| Stabilisers added | Ultimate tensile strength g/dtex | Elongation % | Ultimate tensile strength g/dtex | Elongation % | Ultimate tensile strength g/dtex | Elongation % | Ultimate tensile strength g/dtex | Elongation % |
| without stabiliser | 0.56 colourless | 657 | <0.04 yellow | | no longer measurable friable films, severe cracking elongation | | | |
| + 2% stabiliser II | 0.72 colourless | 651 | 0.70 colourless | 652 | 0.62 almost colourless | 662 | 0.58 almost colourless | 653 |
| 2% UV absorber x) | — colourless | | 0.39 yellowish | 525 | no longer measurable yellow | | — | |
| 1% stabiliser II 1% triphenyl phosphite | 0.55 colourless | 613 | 0.50 colourless | 620 | 0.46 colourless | 637 | 0.41 colourless | 615 |
| 1% stabiliser II 1% triphenyl phosphine + 1.33% | 0.46 colourless | 590 | 0.43 almost colourless xx) | 630 | 0.40 yellowish xx) | 697 | 0.39 yellowish xx) | 678 |

Table 2 — Continued

Fadeometer exposure of film strips or cut threads

| Stabilisers added | Before Exposure | | After Fadeometer Exposure of: | | | | | |
|---|---|---|---|---|---|---|---|---|
| | | | 22 Hours | | 44 Hours | | 66 Hours | |
| | Ultimate tensile strength g/dtex | Elongation % | Ultimate tensile strength g/dtex | Elongation % | Ultimate tensile strength g/dtex | Elongation % | Ultimate tensile strength g/dtex | Elongation % |
| stabiliser II 0.66% UV absorber x) | colourless | | colourless | | colourless | | almost colourless | |
| 2% stabiliser III | xx) colourless | | xx) colourless | | xx) almost colourless pale yellowish | | xx) pale yellowish | |
| 2% stabiliser IV | xx) colourless | | xx) colourless | | xx) almost colourless pale yellowish | | xx) pale yellowish | |
| 2% stabiliser V | xx) colourless | | xx) colourless | | xx) almost colourless pale yellowish | | xx) almost colourless pale yellowish | |
| Comparison tests: | | | | | | | | |
| 2% Compound VI | colourless | | xxx) yellow (already from 15 hours onwards) | | xxx) intense yellow | | xxx) intense yellow | |
| 2% Compound VII | colourless | | xxx) yellow (already from 15 hours onwards) | | xxx) intense yellow | | xxx) intense yellow | |
| 2% 1,3,5-trimethyl 2,4,6-tris-(3,5-ditertiary butyl-4-hydroxy-benzyl)-benzene (Compound X) | colourless | | xxx) almost colourless yellowish | | xxx) yellow | | severe degradation, intense yellow | |
| 2% Compound IX | almost colourless | | strong yellow | | Strength relatively well preserved intense yellow | | yellow brown | | x) 2-(2'-hydroxy-3'-tertiary butyl-5'-methylphenyl)-5-chlorobenzotriazole
xx) strength substantially preserved, no crack formation on elongation.
xxx) films show severe crack formation on elongation with increasing exposure time and substantially reduced ultimate tensile strength.

As shown by the results, a very good improvement is achieved with the stabilisers according to the invention, both as regards preservation of the mechanical strenght and as regards reducing the discoloration, and this improvement can be further enhanced by the addition of UV absorbers of the 2-hydroxyphenyl-benzotriazol type. The addition of triphenyl phosphite or triphenyl phosphine does not provide any substantial improvement. Compounds VI and VII, which differ only slightly in their structure from the stabilisers according to the invention, are substantially inferior since they undergo severe discoloration and their protective action is much weaker. Known stabilisers such as compound IX or X are also distincly inferior in their stabilising effect, the polyurethane either continuing to undergo severe degradation or preserving its strength relatively well but undergoing severe discoloration.

Example 3

600 Parts of a copolyester of adipic acid, hexane-1,6-diol and 2,2-dimethylpropane-1,3-diol containing diol in the molar proportion of 2:1 (OH number 65.6) are heated to 45°C to 51°C for 100 minutes with 11.6 parts of N,N'-bis-(β-hydroxypropyl)-methylamine, 160.3 parts of diphenylmethane-4,4'-diisocyanate and 192 parts of dimethyl formamide and 0.1 part of a 35% solution of $SO_2$ in dioxane until the NCO content has dropped to 2.08% (based on solid NCO prepolymer).

532 parts of this prepolymer solution are stirred into a solution of 17.15 parts of β-semicarbazido propionic acid hydrazide in 34 parts of water and 1119 parts of dimethyl formamide, and 0.2 part of hexane-1,6-diisocyanate and 4% by weight of titanium dioxide are added to the elastomer solution.

Stabilisers are dissolved in elastomer solution in the percentages by weight shown in Table 3 (based on solid substance of elastomer), cast to form films in the usual manner which are cut up into threads and exposed to the Fadiometer.

Table 3

Fadeometer exposure of film strips

| Additions of Stabiliser | Before Exposure | | After Fadeometer Exposure of: | | | | | |
|---|---|---|---|---|---|---|---|---|
| | | | 22 Hours | | 44 Hours | | 66 Hours | |
| | Ultimate tensile strength g/dtex | Elongation % | Ultimate tensile strength g/dtex | Elongation % | Ultimate tensile strength g/dtex | Elongation % | Ultimate tensile strength g/dtex | Elongation % |
| without stabiliser | 0.60 colourless | 666 | 0.50 pale yellowish | 620 | 0.27*) yellow brown | 538 | no longer measurable yellow brown | |
| + 2% stabiliser II | 0.66 | 687 | 0.66 | 673 | 0.62 | 681 | 0.60 | 680 |

3,875,246

Table 3—Continued

Fadeometer exposure of film strips

| Additions of Stabiliser | Before Exposure | | After 22 Hours | | After 44 Hours | | After 66 Hours | |
|---|---|---|---|---|---|---|---|---|
| | Ultimate tensile strength g/dtex | Elongation % | Ultimate tensile strength g/dtex | Elongation % | Ultimate tensile strength g/dtex | Elongation % | Ultimate tensile strength g/dtex | Elongation % |
| 2% stabiliser IV | colourless | — | colourless | | colourless | | colourless | |
| | | | Strength preserved, surface smooth and homogeneous when stretched | | | | | |
| Comparison Examples: | | | | | | | | |
| Compound IX 2% | colourless almost | | colourless | | almost colourless intense | | — | |
| 2% Compound X | colourless | — | lemon yellow | — | lemon yellow | — | Yellow brown | — |
| | colourless | | pale yellowish | | pale yellowish brown | | yellowish brown | |
| 2% Compound VIII | — | | colourless | | — | | — | |
| | | | yellowish to yellow | | yellow | | yellow | |

*)surface of the films breaks up into a large number of cracks when stretched owing to crosslinking on the surface.

Example 4

600 Parts of the copolyester described in Example 3 are heated to 85°C in the melt for 38 minutes with 173.4 parts of diphenylmethane-4,4'-diisocyanate and 11,9 parts of N,N'-bis-($\beta$-hydroxypropyl)-methylamine, and the resulting NCO prepolymer melt (2.76% NCO) is introduced into a solution heated to 80°C to 23.0 parts of carbodihydrazide in 2431 parts of dimethyl formamide with the addition of 32 parts of $TiO_2$, a highly viscous (530 P) elastomer solution being formed.

The stabilisers or comparison substances shown in Table 4 are added to this elastomer solution which in then exposed to light in the Fadeometer in the form of film strips.

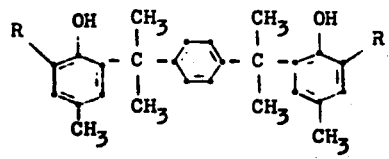

in which

R is either a straight or branched chain alkyl group containing 1 to 18 carbon atoms, a cycloalkyl group containing 5 to 6 carbon atoms which may be substituted by one or more lower alkyl groups, or an aralkyl group containing 7 to 9 carbon atoms.

Table 4

Fadeometer exposure of film strips (approx. 350 dtex)

| Additions of Stabiliser | Before Exposure | | After 22 Hours | | After 44 Hours | | After 66 Hours | |
|---|---|---|---|---|---|---|---|---|
| | Ultimate tensile strength g/dtex | Elongation % | Ultimate tensile strength g/dtex | Elongation % | Ultimate tensile strength g/dtex | Elongation % | Ultimate tensile strength g/dtex | Elongation % |
| without stabiliser | 0.62 | 550 | 0.43 yellowish | 502 | 0.22 yellowish | 385 | no longer measurable | |
| + 2% stabiliser II | 0.63 | 581 | 0.67 colourless | 595 | 0.60 colourless | 567 | 0.47 almost colourless | 495 |

What we claim is:

1. A polyurethane stabilizing compound of the formula:

2. A compound as claimed in claim 1 in which R is a methyl, t-butyl, cyclopentyl or cyclohexyl group.

* * * * *

UNITED STATES PATENT AND TRADEMARK OFFICE
CERTIFICATE OF CORRECTION

PATENT NO. : 3,875,246
DATED : April 1, 1975
INVENTOR(S) : Harald Oertel et al

It is certified that error appears in the above-identified patent and that said Letters Patent are hereby corrected as shown below:

Column 4, line 45, "triu" should be ---tris---.

Column 7, line 42, Brackets should be placed around the formula.

Column 7, line 48, "R.N.H.CO.O.D.O.CO.NH.R- should be ---R.NH.CO.O.D.O.CO.NH.R.---.

Column 7, last line after "atoms." Munich should be deleted.

Column 8, line 8, "Munic" should be ---Munich---.

Column 8, line 52, second occurrence "polyesters" should be ---polyethers---.

Column 10, line 12 after 220°C. the following was left out $C_{30}H_{46}O_2$ Molecular Weight: 510

Calculated: C 84.7 H 9.02 O 6.28

Found: C 83.9 H 9.1 O 6.3 and should be inserted.

Column 10, line 40, "1830°C" should be ---183°C---.

Column 12, line 7, after "with" insert ---the---.
Column 13, line 39, "strenght" should be ---strength---.
Column 14, line 51, after "in" insert ---this---.
Column 14, line 55, "Fadiometer" should be ---Fadeometer---
Column 15, line 34, "in" should be ---is---.

Signed and Sealed this

Twenty-sixth Day of April 1977

[SEAL]

Attest:

RUTH C. MASON
Attesting Officer

C. MARSHALL DANN
Commissioner of Patents and Trademarks